US012205544B2

(12) United States Patent
Furukawa et al.

(10) Patent No.: US 12,205,544 B2
(45) Date of Patent: Jan. 21, 2025

(54) DISPLAY DEVICE

(71) Applicant: SHARP KABUSHIKI KAISHA, Sakai (JP)

(72) Inventors: Hiroyuki Furukawa, Sakai (JP); Masafumi Ueno, Sakai (JP); Chie Toridono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/286,197

(22) PCT Filed: May 14, 2021

(86) PCT No.: PCT/JP2021/018306
§ 371 (c)(1),
(2) Date: Oct. 9, 2023

(87) PCT Pub. No.: WO2022/239213
PCT Pub. Date: Nov. 17, 2022

(65) Prior Publication Data
US 2024/0379054 A1 Nov. 14, 2024

(51) Int. Cl.
*G09G 3/3233* (2016.01)

(52) U.S. Cl.
CPC ... *G09G 3/3233* (2013.01); *G09G 2320/0247* (2013.01); *G09G 2360/144* (2013.01)

(58) Field of Classification Search
CPC ..... G09G 2360/144; G09G 2320/0247; G09G 3/3233
See application file for complete search history.

(56) References Cited

U.S. PATENT DOCUMENTS

| | | | | |
|---|---|---|---|---|
| 2009/0201286 A1 | 8/2009 | Hasegawa et al. | | |
| 2010/0309213 A1 * | 12/2010 | Chen | G09G 3/3406 345/589 |
| 2012/0169802 A1 | 7/2012 | Hasegawa et al. | |
| 2014/0307009 A1 | 10/2014 | Hasegawa et al. | |
| 2016/0189637 A1 | 6/2016 | Hasegawa et al. | |
| 2016/0321998 A1 | 11/2016 | Hasegawa et al. | |
| 2017/0069272 A1 | 3/2017 | Hasegawa et al. | |
| 2017/0270872 A1 * | 9/2017 | Morimoto | G09G 3/3406 |
| 2017/0352315 A1 | 12/2017 | Hasegawa et al. | |

FOREIGN PATENT DOCUMENTS

| | | |
|---|---|---|
| JP | 2008-146093 A | 6/2008 |
| JP | 2009-186884 A | 8/2009 |

* cited by examiner

*Primary Examiner* — Kevin M Nguyen
(74) *Attorney, Agent, or Firm* — ScienBiziP, P.C.

(57) ABSTRACT

A display device includes a plurality of pixel circuits each including a self-luminous element and a switching element that performs switching between light emission and non-light emission of the self-luminous element, the plurality of pixel circuits being provided respectively corresponding to a plurality of pixels, and a control circuit that controls each of the plurality of pixel circuits in response to an image signal of an image to be displayed. The control circuit controls switching between the light emission and the non-light emission by the switching element and thus the self-luminous element emits light at least in a certain period from the start of the dimming control period and a certain period until the end of the dimming control period.

19 Claims, 7 Drawing Sheets

| BLACK INSERTION RATE | RELATIVE DIMMING RATE | NUMBER OF PULSES |
|---|---|---|
| 60.0% | 50.0% | 3 |
| 40.0% | 33.3% | 4 |
| 20.0% | 25.0% | 5 |

FIG. 7

DISPLAY DEVICE

TECHNICAL FIELD

The present disclosure relates to a display device.

BACKGROUND ART

PTL 1 discloses a display device in which a current is supplied to an EL element only in a period of 1/N of one frame, a current is not supplied to the EL element and a reverse bias voltage is applied to the EL element in the rest of the period.

CITATION LIST

Patent Literature

PTL1: JP 2008-146093 A

SUMMARY

Technical Problem

However, in PTL 1 described above, a configuration for obtaining necessary luminance while suppressing the occurrence of a motion blur in an image has not been sufficiently studied.

An object of the disclosure is to provide a display device that can obtain necessary luminance while suppressing the occurrence of a motion blur in an image.

Solution to Problem

A display device according to an aspect of the disclosure includes a plurality of pixel circuits each including a self-luminous element and a switching element configured to perform switching between light emission and non-light emission of the self-luminous element, the plurality of pixel circuits being provided respectively corresponding to a plurality of pixels; and a control circuit configured to control each of the plurality of pixel circuits in response to an image signal of an image to be displayed. In the display device, when a longest period among a plurality of periods in which the self-luminous element continuously emits no light in one frame period, among a plurality of frame periods constituting the image, is set as a black insertion period and a remaining period excluding the black insertion period in the one frame period is set as a dimming control period, the control circuit controls switching between the light emission and the non-light emission by the switching element and thus the self-luminous element emits light at least in a certain period from start of the dimming control period and a certain period until end of the dimming control period.

BRIEF DESCRIPTION OF DRAWINGS

FIG. 7 is a graph showing a correspondence relationship between a black insertion rate, a relative dimming rate, and the number of pulses that are set in one frame period for one pixel to be caused to perform display on the display device according to the third modification example of the embodiment of the disclosure.

DESCRIPTION OF EMBODIMENTS

Figure 1:
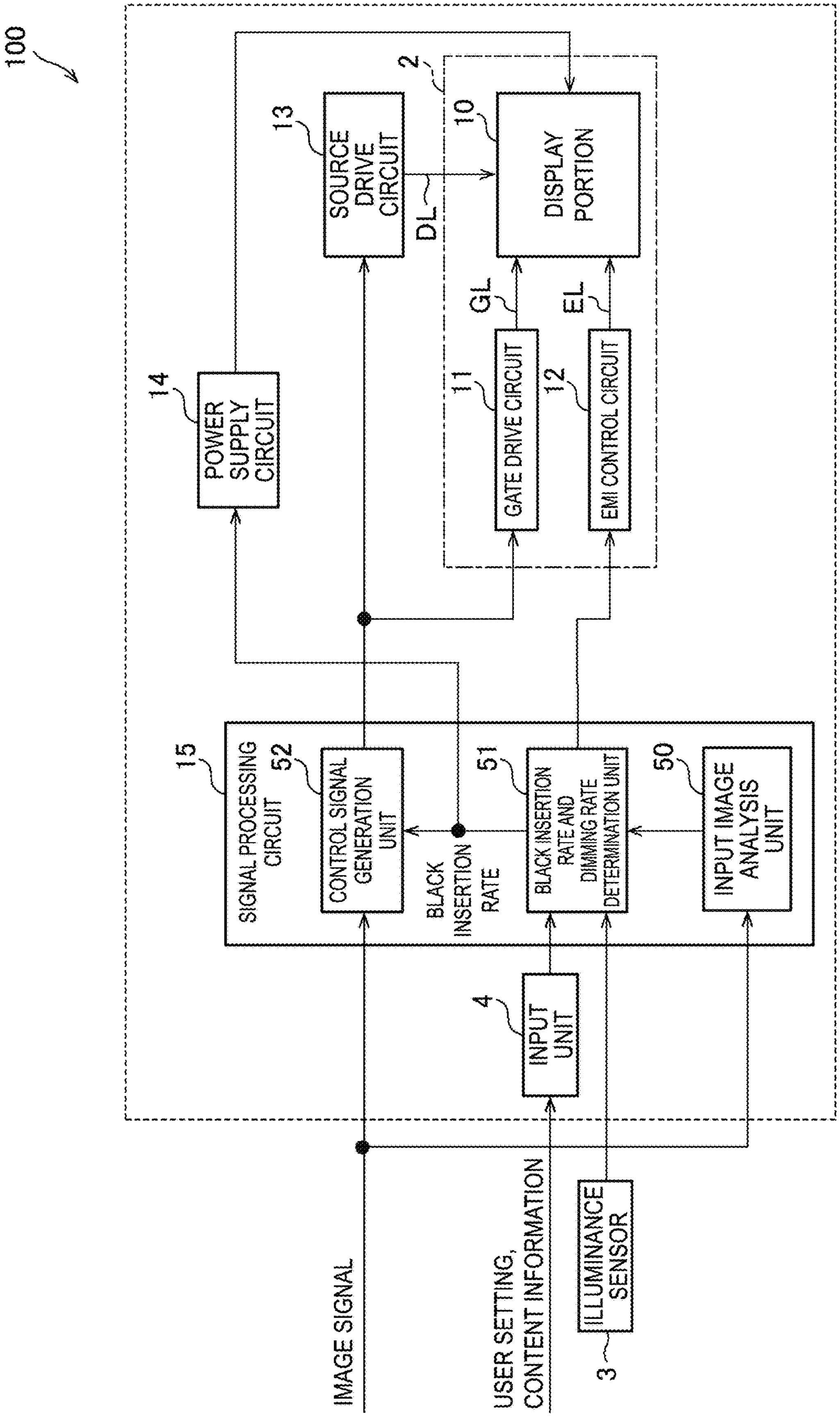
FIG. 1 is a schematic block diagram illustrating a configuration of main portions of a display device according to an embodiment of the disclosure.

Hereinafter, an embodiment and modification examples of the disclosure will be described with reference to the accompanying drawings. Note that the same reference numerals are assigned to the same or equivalent members throughout all of the drawings below, and a repeated description thereof will be omitted. In addition, the embodiment and the modification examples described below are merely examples of the disclosure, and the disclosure is not limited to the embodiment and the modification examples. Other than the embodiment and the modification examples, various modifications can be made in accordance with the design and the like within the scope of the technical idea of the disclosure.

Display Device

A display device 100 according to the embodiment will be described with reference to FIG. 1. FIG. 1 is a schematic block diagram illustrating a configuration of main portions of the display device 100 according to the embodiment of the disclosure. The display device 100 is a display device such as an organic EL display or a quantum dot light-emitting diode (QLED) display that includes a self-luminous light-emitting element. Hereinafter, a case where the display device 100 is an organic EL display including an organic EL element 21 (see FIG. 2 to be described below) as a light-emitting element will be described as an example.

As illustrated in FIG. 1, the display device 100 includes a display portion 10, an OLED display panel 2 including a gate drive circuit 11 and an EMI control circuit 12, a source drive circuit 13, a power supply circuit 14, and a signal processing circuit 15. In the OLED display panel 2, the gate drive circuit 11 and the EMI control circuit 12 may be monolithically formed.

In the display device 100, when an image signal of an image to be displayed is input from the outside, the signal processing circuit 15 performs various types of signal processing in response to the image signal. Then, image information is added to the display portion 10 through an external drive circuit including the gate drive circuit 11, the EMI control circuit 12, the source drive circuit 13, and the power supply circuit 14, and an image is displayed on the display portion 10. Note that the external drive circuit corresponds to a control circuit of the disclosure.

That is, in the display portion 10, a plurality of data lines DL and a plurality of gate lines GL are arranged crossing each other. A pixel circuit 20 (see FIG. 2 to be described below) that performs driving and displaying of each pixel is connected to each of intersections between the plurality of data lines DL and the plurality of gate lines GL. The display portion 10 constitutes an array of a plurality of pixel circuits 20 as a whole. Further, each of a plurality of EMI lines EL is connected to the pixel circuit 20 of each pixel.

The power supply circuit 14 includes a first power supply ELVDD that applies a high-level power supply voltage, which is a constant voltage, and a second power supply ELVSS that applies a low-level power supply voltage to the display portion 10 (see FIG. 2 to be described below).

The source drive circuit 13 supplies a data signal indicating image information to the display portion 10. That is, when the source drive circuit 13 receives a drive control signal from the signal processing circuit 15, the source drive circuit 13 supplies the data signal to each of all the data lines DL arranged in the display portion 10 in response to the drive control signal. Note that examples of the drive control signal include a clock signal for synchronizing operations of the source drive circuit 13 and another external drive circuit.

The gate drive circuit 11 supplies a scanning signal to the display portion 10 through the gate lines GL. That is, when the gate drive circuit 11 receives a scanning control signal from the signal processing circuit 15, the gate drive circuit 11 sequentially supplies, in response to the scanning control signal, active scanning signals to the display portion 10 through each of the plurality of gate lines GL arranged in the display portion 10. When the active scanning signals are supplied in this manner, the gate lines GL are changed from a non-select state to a select state. Note that examples of the scanning control signal include a clock signal for synchronizing operations of the gate drive circuit 11 and another external drive circuit.

The EMI control circuit 12 applies an EMI signal to the display portion 10 and controls switching between light emission and non-light emission of the organic EL element 21 in the pixel circuit 20. That is, when the EMI control circuit 12 receives an EMI control signal from the signal processing circuit 15, the EMI control circuit 12 sequentially inputs, in response to the EMI control signal, an EMI signal, which is a binary signal defining an ON state and an OFF state of a third transistor T3 (switching element) to be described later, to each of the plurality of EMI lines EL arranged in the display portion 10. In the pixel circuit 20, in response to the EMI signal, the third transistor T3 is turned on so that a drive current is supplied to the organic EL element 21, or the third transistor T3 is turned off so that a drive current is cut off, thereby performing switching between light emission and non-light emission of the organic EL element 21.

The signal processing circuit 15 includes an input image analysis unit 50, a black insertion rate and dimming rate determination unit 51, and a control signal generation unit 52. Note that the black insertion rate and dimming rate determination unit 51 corresponds to a black insertion rate determination unit and a dimming rate determination unit of the disclosure.

The input image analysis unit 50 analyzes an image signal and transmits an analysis result to the black insertion rate and dimming rate determination unit 51. More specifically, when the signal processing circuit 15 receives an image signal, the input image analysis unit 50 detects a motion vector from the image signal. Then, the input image analysis unit 50 calculates an average value of motion vector amounts in a certain period of one frame or more to obtain a motion amount of an image to be displayed. The input image analysis unit 50 transmits the obtained motion amount to the black insertion rate and dimming rate determination unit 51.

In addition, the input image analysis unit 50 obtains an average picture level (APL), which is an average luminance value of an image to be displayed from the image signal. Then, the input image analysis unit 50 transmits the obtained APL to the black insertion rate and dimming rate determination unit 51.

The black insertion rate and dimming rate determination unit 51 determines a black insertion rate and a dimming rate based on the analysis result of the image signal which is obtained by the input image analysis unit 50. That is, the black insertion rate and dimming rate determination unit 51 determines a black insertion rate based on the motion amount received from the input image analysis unit 50. The black insertion rate and dimming rate determination unit 51 sets a black insertion rate such that it increases as the motion amount input from the input image analysis unit 50 increases. In this manner, since the black insertion rate and dimming rate determination unit 51 can determine the black insertion rate based on the motion amount, the black insertion rate can be set in accordance with a motion amount of an image to be displayed, and thus the occurrence of a motion blur can be appropriately suppressed.

Note that the black insertion rate is a proportion of a black insertion period, in which the organic EL element 21 emits no light, in one frame period among a plurality of frame periods constituting an image. More precisely, the black insertion period is the longest period among a plurality of periods in which the organic EL element 21 continuously emits no light in one frame period.

The display device 100 is configured such that a black insertion period is provided in one frame period to shorten a holding time of light emitted from the display portion 10. The display device 100 can suppress the occurrence of a motion blur in an image by thus providing the black insertion period in one frame period.

Although details will be described later, in the display device 100, a period in which the organic EL element 21 emits no light in order to suppress the occurrence of a motion blur as described above and a period in which the organic EL element 21 intermittently emits light in order to adjust the brightness of light emitted from the display portion 10 are provided in one frame period. Consequently, in the display device 100, the longest period among the periods in which the organic EL element 21 continuously emits no light is defined as a black insertion period. On the other hand, in one frame period, a remaining period excluding the black insertion period is defined as a dimming control period.

The black insertion rate and dimming rate determination unit 51 determines a dimming rate in accordance with the APL input from the input image analysis unit 50. The dimming rate is a proportion of a period in which the display portion 10 emits light in a dimming control period. In general, an organic EL display cannot express a bright image with a large area, and an image displayed on the display portion 10 in response to an image signal may be darker than an image ideally displayed in response to the image signal. For this reason, when APL of an image to be displayed is high, the black insertion rate and dimming rate determination unit 51 determines a dimming rate such that it is larger than an initial setting value. In addition, when APL of an image to be displayed is high and an average luminance of an image to be displayed on the display portion 10 decreases due to an IR drop on a power source wiring line, the black insertion rate and dimming rate determination unit 51 determines a dimming rate such that it is larger than an initial setting value so as to compensate for the decrease in the average luminance. Here, the initial setting value is a value that is set in advance at the time of shipment of the display device 100 or the like, and is appropriately set in accordance with a relationship between the display performance of the display portion 10 and an image signal.

The black insertion rate and dimming rate determination unit 51 is configured to determine a black insertion rate and a dimming rate based on an analysis result of an image signal which is obtained by the input image analysis unit 50 as described above. However, the black insertion rate and dimming rate determination unit 51 may be configured to determine a black insertion rate and a dimming rate based on a user's settings or content information of an image to be displayed.

For example, the black insertion rate and dimming rate determination unit 51 determines the black insertion rate such that it is lower than the initial setting value when an image to be displayed is a moving image with a few motions, and determines the black insertion rate such that it is higher than the initial setting value when an image to be displayed is a moving image with many motions.

For example, based on the content information associated with an image to be displayed, the black insertion rate and dimming rate determination unit 51 determines the black insertion rate such that it is lower than the initial setting value when the image to be displayed is a moving image with a few motions. On the other hand, when the image to be displayed is a moving image with many motions, the black insertion rate is determined such that it is higher than the initial setting value. In this manner, the black insertion rate and dimming rate determination unit 51 can appropriately determine the black insertion rate in accordance with the type of image to be displayed.

In addition, for example, based on the content information associated with an image to be displayed, the black insertion rate and dimming rate determination unit 51 determines the dimming rate such that it is higher than the initial setting value when the image to be displayed is bright. On the other hand, when the image to be displayed is dark, the dimming rate is determined to be lower than the initial setting value.

The display device 100 also includes an input unit 4 that receives input information from a user. The black insertion rate and dimming rate determination unit 51 may be configured to determine the dimming rate based on a setting value of the dimming rate that is input via the input unit 4. In this manner, in the case of a configuration in which the black insertion rate and dimming rate determination unit 51 determines a dimming rate based on a dimming rate input via the input unit 4, it is possible to control the dimming rate according to the user's preference.

The black insertion rate and dimming rate determination unit 51 may be configured to determine a black insertion rate based on a setting value of a black insertion rate input via the input unit 4. In the case of such a configuration in which the black insertion rate and dimming rate determination unit 51 determines a black insertion rate based on a black insertion rate input via the input unit 4, it is possible to control the black insertion rate according to the user's preference.

Furthermore, an illuminance sensor 3 communicably connected to the signal processing circuit 15 may be provided inside or outside the display device 100, and the black insertion rate and dimming rate determination unit 51 may be configured to determine a dimming rate based on a measurement value indicating the brightness around the display device 100 which is measured by the illuminance sensor 3.

For example, when the value indicating the brightness around the display device 100 in a normal use environment is set as a reference value and a measurement value measured by the illuminance sensor 3 is larger than the reference value, the black insertion rate and dimming rate determination unit 51 determines a dimming rate such that it is high so as to prevent difficulty in viewing an image to be displayed due to the brightness around the display device 100. On the other hand, when the brightness sensed by the illuminance sensor 3 is lower than the reference value, the black insertion rate and dimming rate determination unit 51 determines a dimming rate such that it is low in order to inhibit the brightness of an image to be displayed from becoming higher than necessary.

When the black insertion rate and dimming rate determination unit 51 determines a black insertion rate and a dimming rate, the black insertion rate and dimming rate determination unit 51 inputs signals indicating the determined black insertion rate and dimming rate to the control signal generation unit 52 and the power supply circuit 14.

For example, when the black insertion rate and dimming rate determination unit 51 determines the black insertion rate such that it is higher than an initial setting value, a light emission period of the organic EL element 21 is shortened, and thus the luminance of light emitted from the display portion 10 is decreased.

Consequently, when the black insertion rate is higher than the initial setting value, the control signal generation unit 52 transmits a drive control signal to the source drive circuit 13 so that gray scale correction is performed in order to compensate for the decrease in luminance.

When the black insertion rate is higher than the initial setting value, the power supply circuit 14 corrects the magnitude of a voltage applied to the display portion 10 in order to compensate for the decrease in luminance.

Further, the black insertion rate and dimming rate determination unit 51 inputs the signals indicating the determined black insertion rate and dimming rate to the EMI control circuit 12. In response to the input signals, the EMI control circuit 12 generates an EMI signal specifying the number of times of light emission, a light emission timing, and a light emission period of the organic EL element 21 in one frame period, and inputs the EMI signal to the display portion 10 through the EMI lines EL.

Note that, in the display device 100, a black insertion rate is set to be constant in each of a plurality of frame periods constituting an image displayed on the display portion 10. This is because when the black insertion rate is different in each frame period, brightness is different in each frame period, and a flicker occurs in an image to be displayed.

Pixel Circuit

Next, the pixel circuit 20 provided for each pixel will be described with reference to FIG. 2. FIG. 2 is a circuit diagram illustrating an example of a configuration of the pixel circuit 20 in the display device 100 according to the embodiment of the disclosure. The pixel circuit 20 provided at an intersection of an m-th data line DL(m) among the plurality of data lines DL arranged in the display portion 10 and an n-th gate line GL(n) among the plurality of gate lines GL will be described as an example of the pixel circuit 20.

A p-th EML line (p) is connected to each pixel circuit 20. Note that m, n, and p are natural numbers.

Figure 2:
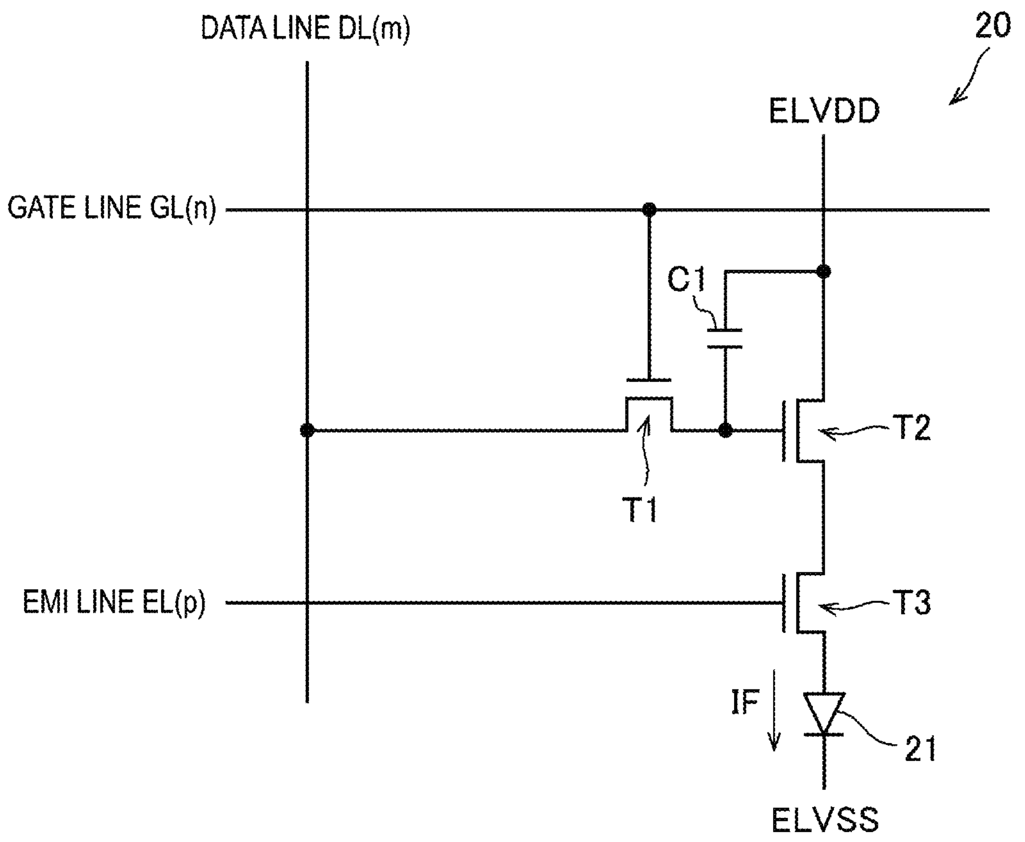
FIG. 2 is a circuit diagram illustrating an example of a configuration of a pixel circuit in the display device according to the embodiment of the disclosure.

As illustrated in FIG. 2, the pixel circuit 20 includes a first transistor T1, a second transistor T2, a third transistor T3, a capacitor C1, and an organic EL element 21.

The first transistor T1 is a scanning thin film transistor which is electrically connected to a gate line GL(n) on the gate side. The second transistor T2 is a drive thin film transistor. The third transistor T3 is a switching element that allows a drive current to be supplied to the organic EL element 21 or cuts off the drive current. Note that a state in which a drive current is caused to flow by the third transistor T3 is referred to as an ON state, and a state in which the drive current is cut off is referred to as an OFF state. Control of switching between the ON state and the OFF state by the third transistor T3 is referred to as ON/OFF control.

The display portion 10 adopts an active matrix driving method in which the organic EL element 21 is driven by a thin film transistor formed in a pixel.

More specifically, as illustrated in FIG. 2, the second transistor T2 and the third transistor T3 are connected in series in this order from the first power supply ELVDD toward the organic EL element 21, between the first power supply ELVDD and the organic EL element 21. One end of the capacitor C1 is connected between the first power supply ELVDD and a source of the second transistor T2, and a drain of the second transistor T2 is connected to a source of the third transistor T3.

A drain of the third transistor T3 is connected to an anode electrode of the organic EL element 21, and a gate of the third transistor T3 is connected to the EMI line EL(p).

A gate of the first transistor T1 is connected to the gate line GL(n). A source of the first transistor T1 is connected to the data line DL(m). A drain of the first transistor T1 is connected to the other end of the capacitor C1.

When the gate line GL(n) is in a non-select state, the first transistor T1 is in an OFF state. When the active scanning signal is supplied and the gate line GL(n) changes from a non-select state to a select state, the first transistor T1 is turned on, and the source and the drain of the first transistor T1 are electrically connected to each other.

Thus, a data signal is supplied to the capacitor C1 through the data line DL(m), and a voltage corresponding to the data signal is held in the capacitor C1. Thereafter, when the gate line GL(n) changes from a select state to a non-select state, the first transistor T1 is turned off, and a voltage held by the capacitor C1 is determined. The second transistor T2 supplies a drive current to the organic EL element 21 in accordance with the voltage held by the capacitor C1.

The drive current supplied from the second transistor T2 to the organic EL element 21 is on/off controlled by the third transistor T3. That is, an EMI signal is input to the third transistor T3 from the EMI control circuit 12 through the EMI line EL(p). Consequently, a period in which the third transistor T3 is in an ON state and a period in which the third transistor T3 is in an OFF state are specified in response to the EMI signal.

In the period in which the third transistor T3 is in the ON state, the source and the drain of the third transistor T3 are electrically connected to each other, a drive current is supplied to the organic EL element 21, and the organic EL element 21 emits light. On the other hand, in the period in which the third transistor T3 is in the OFF state, a drive current is cut off in the third transistor T3, and the organic EL element 21 emits no light. In this manner, by switching the third transistor T3 between an ON state and an OFF state, the organic EL element 21 can be switched between light emission and non-light emission.

The display device 1 is configured to control the amount of light emitted from the display portion 10 by performing switching between light emission and non-light emission of the organic EL element 21 through ON/OFF control of the third transistor T3.

Dimming Control

Figure 3:
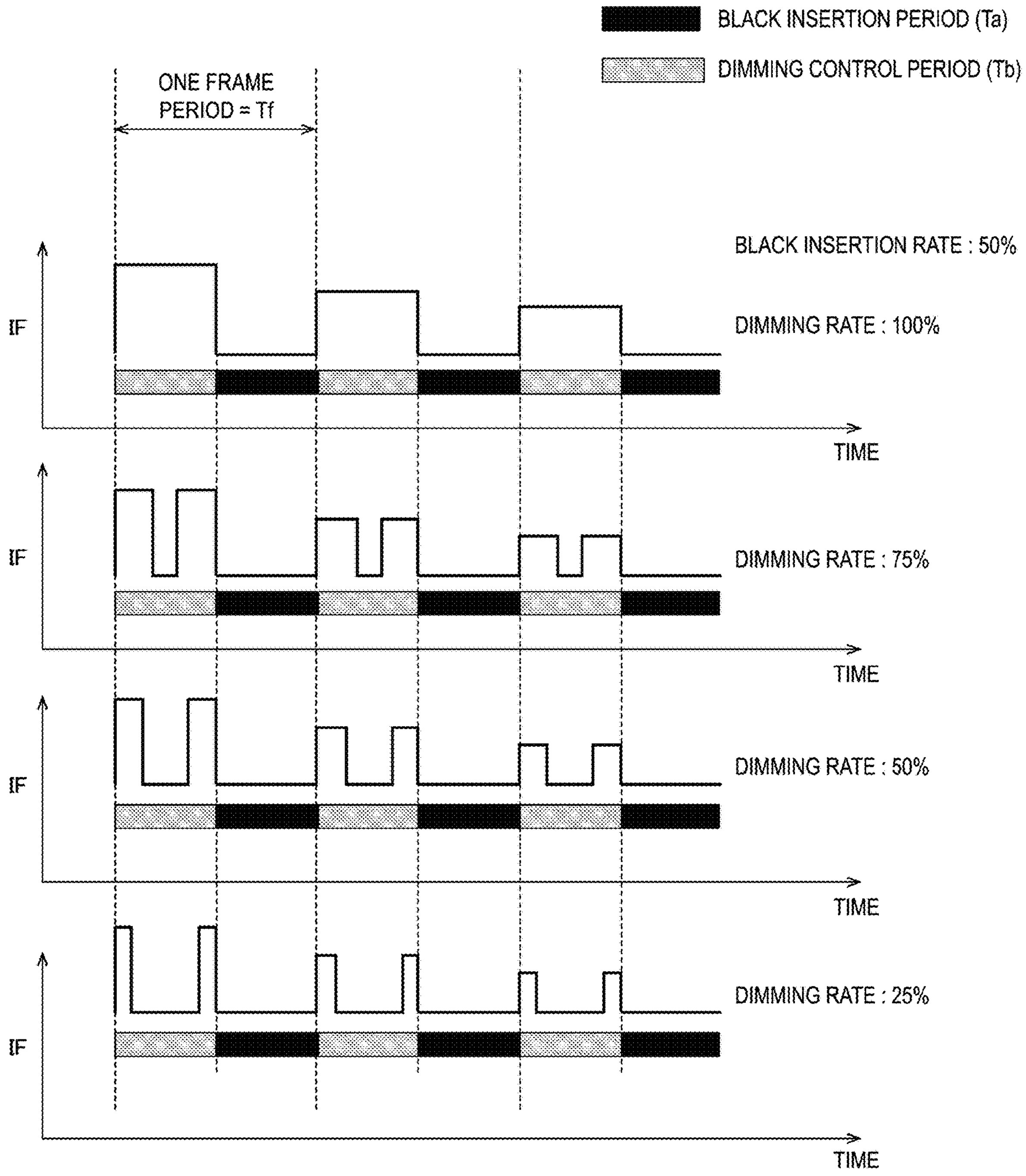
FIG. 3 is a chart showing an example of a black insertion period and a dimming control period that are set in one frame period for one pixel to be caused to perform display on the display device according to the embodiment of the disclosure.

Hereinafter, dimming control in the display device 100 will be described with reference to FIG. 3. FIG. 3 is a chart showing an example of a black insertion period Ta and a dimming control period Tb that are set in one frame period Tf for one pixel caused to perform display on the display device 100 according to the embodiment of the disclosure. In FIG. 3, the black insertion period Ta and the dimming control period Tb are shown so as to be comparable in the cases where the dimming rate is 100%, 75%, 50%, and 25%.

In FIG. 3, the horizontal axis represents time, and the vertical axis represents the amount of forward drive current IF flowing through the organic EL element 21. The organic EL element 21 emits light in a period in which the amount of the drive current IF is large, and emits no light in a period in which the drive current IF does not flow. Note that although FIG. 3 shows a case where a half of one frame period Tf is the black insertion period Ta (Ta=0.5×Tf), that is, a case where the black insertion rate is 50%, the proportion of the black insertion period Ta in one frame period Tf is not limited thereto.

In the display device 100 according to the present embodiment, the black insertion period Ta is set in one frame period Tf in order to suppress a motion blur in an image to be displayed. Since the black insertion period Ta and the dimming control period Tb are separately provided in one frame period Tf, a black insertion rate and a dimming rate in one frame period can be set independently of each other.

In this manner, the black insertion rate and the dimming rate can be set independently of each other, and thus the luminance of an image to be displayed can be changed while a black insertion period is fixed to be a certain period, for example, without performing complicated control such as change of a gray scale voltage.

Note that, when the proportion of the black insertion period Ta in one frame period Tf increases and a period in which the organic EL element 21 emits light is excessively shortened, a flicker may occur. Further, as the dimming control period Tb becomes shorter, it is necessary to increase the luminance of light emitted from the organic EL element 21 in the dimming control period Tb. For this reason, it is necessary to increase the amount of the drive current IF flowing through the organic EL element 21 in the pixel circuit 20.

For this reason, in consideration of a frame rate of an image to be displayed, a screen size of the OLED display panel 2, and the like, a black insertion rate is preferably set to a value in the range from 25% to 50%.

In the display device 100 according to the present embodiment, a black insertion rate is 50% in one frame period Tf, and thus the dimming control period Tb in the one frame period Tf is also a half of the one frame period Tf (Tb=(1−0.5)×Tf). In the one frame period Tf, the black insertion period Ta is set at a stage subsequent to the dimming control period Tb.

As shown in FIG. 3, the display device 100 is configured to cause the organic EL element 21 to emit light in at least a certain period from the start of the dimming control period Tb and a certain period until the end of the dimming control period Tb through ON/OFF control of the third transistor T3 in response to the EMI signal input from the EMI control circuit 12. The display device 100 is configured to change a dimming rate to 75%, 50%, and 25% by changing the length of one light emission period of the organic EL element 21 in the dimming control period Tb while keeping the length of the dimming control period Tb constant.

By causing the organic EL element 21 to necessarily emit light in the certain period from the start of the dimming control period Tb and the certain period until the end of the dimming control period Tb in this manner, the display device 100 can make the length of the dimming control period Tb constant in one frame period Tf. In addition, since the length of the dimming control period Tb can be made constant in one frame period Tf, the length of the black insertion period Ta can also be fixed to be a constant period. For this reason, an effect of suppressing a motion blur in an image can be kept constant without being affected by the luminance of an image to be displayed.

Specifically, when the dimming rate is set to 75%, a period of 75% of the dimming control period Tb is set as a light emission period. In the dimming control period Tb, the lengths of light emission periods are the same. That is, the length of one light emission period of the organic EL element 21 is (½)×0.75×dimming control period Tb.

Similarly, when the dimming rate is set to 50%, the length of one light emission period by the organic EL element 21 is (½)×0.50×dimming control period Tb, and when the dimming rate is set to 25%, the length of one light emission period of the organic EL element 21 is (½)×0.25×dimming control period Tb.

In addition, for a plurality of frame periods constituting an image, end timings of the last light emission periods in the dimming control periods Tb are set to match each other regardless of a dimming rate set in the dimming control period Tb. Since the end timings of the last light emission periods match each other in the plurality of frame periods as described above, the black insertion period Ta provided at a stage subsequent to the dimming control period Tb can be made constant in each of the plurality of frame periods.

Since the black insertion period Ta can be made constant in each of the plurality of frame periods regardless of the dimming rate set in the dimming control period Tb in this manner, an effect of suppressing the occurrence of a motion blur in an image to be displayed can be made constant.

In the present embodiment, the two light emission periods in the dimming control period Tb have the same length. Although the lengths of the two light emission periods are not necessarily the same, when the lengths of the light emission periods in the dimming control period Tb are different, a flicker is likely to be recognized, and thus it is preferable that the lengths of the two light emission periods be the same.

Note that, in gray scale correction such as γ correction, a correction value that is set when a dimming rate is 100% can also be applied in the case of other dimming rates.

First Modification Example

Figure 4:
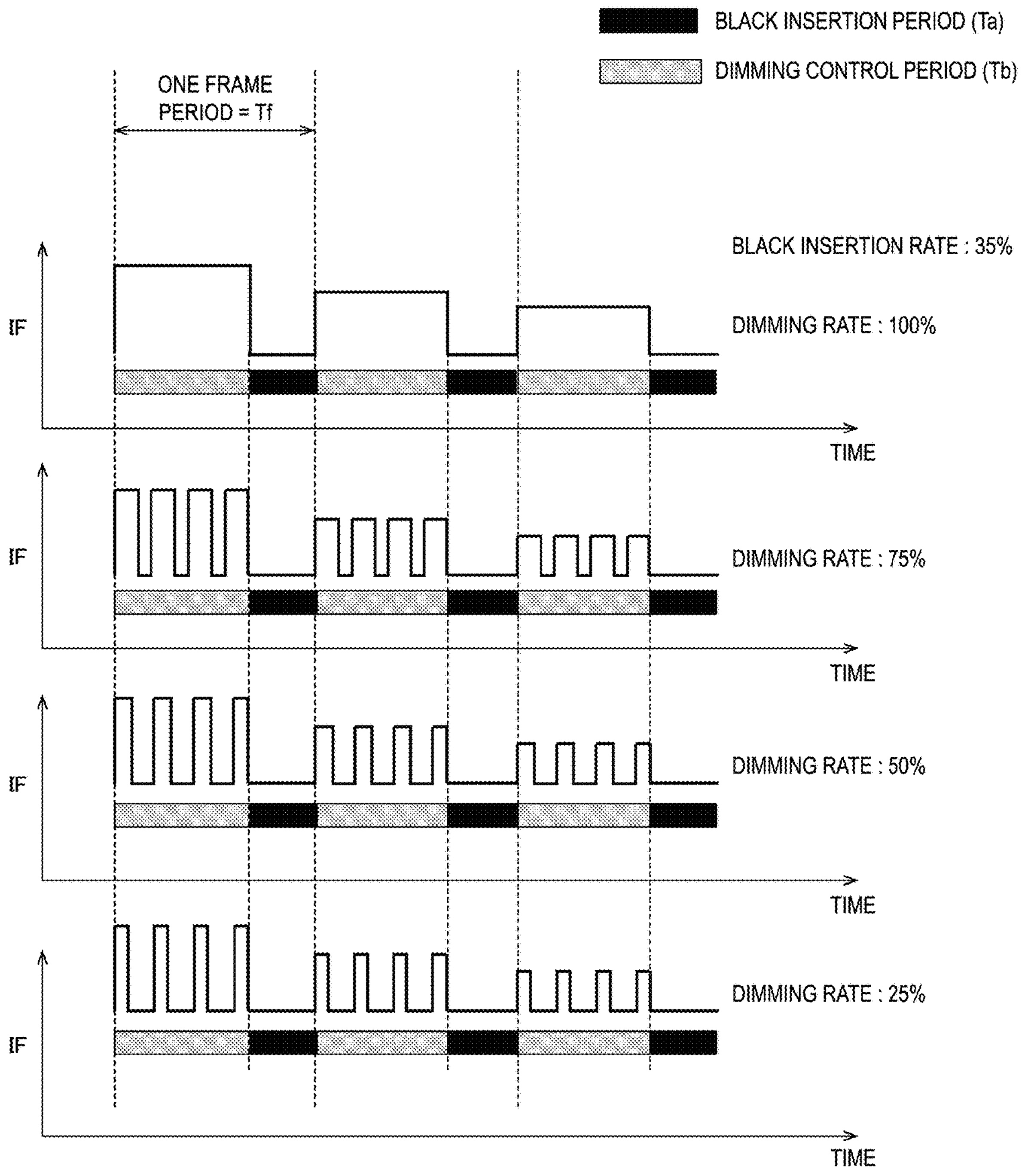
FIG. 4 is a chart showing an example of a black insertion period and a dimming control period that are set in one frame period for one pixel to be caused to perform display on a display device according to a first modification example of the embodiment of the disclosure.

Next, dimming control in a display device 100 according to a first modification example of the present embodiment will be described with reference to FIG. 4. FIG. 4 is a chart showing an example of a black insertion period Ta and a dimming control period Tb that are set in one frame period Tf for one pixel caused to perform display on the display device 100 according to the first modification example of the embodiment of the disclosure. In FIG. 4, the black insertion period Ta and the dimming control period Tb are shown so as to be comparable in the cases where the dimming rate is 100%, 75%, 50%, and 25%. In FIG. 4, the horizontal axis represents time, and the vertical axis represents the amount of forward drive current IF flowing through the organic EL element 21.

Since the display device 100 according to the first modification example of the present embodiment has a similar configuration to that of the display device 100 according to the present embodiment, the same reference numerals are assigned to similar members, and the description thereof will be omitted.

A difference is that the black insertion rate in one frame period Tf is 50% in the display device 100 according to the present embodiment, whereas a black insertion rate in one frame period Tf is 35% in the display device 100 according to the first modification example of the present embodiment.

Another difference is that the number of times the organic EL element 21 emits light in the dimming control period Tb of the frame period Tf is two in the display device 100 according to the present embodiment, whereas the number of times the organic EL element 21 emits light is increased to four in the display device 100 according to the first modification example of the present embodiment. Hereinafter, the number of times the organic EL element 21 emits light will be referred to as the number of pulses.

That is, since the dimming control period Tb in the frame period Tf in the display device 100 according to the first modification example of the present embodiment is longer than that in the display device 100 according to the present embodiment, the number of pulses is increased to prevent a period in which the organic EL element 21 continuously emits no light from becoming longer in the dimming control period Tb. In this manner, the dimming control period Tb and the black insertion period Ta can be clearly distinguished from each other by increasing the number of pulses in the dimming control period Tb.

Note that, even when a dimming rate is low, it is preferable to increase the number of pulses in the dimming control period Tb from the viewpoint of distinguishing the dimming control period Tb from the black insertion period Ta.

FIG. 4 shows the dimming control period Tb when a black insertion rate is 35% and a dimming rate is 75%, 50%, and 25% in the frame period Tf in the display device 100 according to the first modification example of the present embodiment. The number of pulses in the dimming control period Tb is four.

When a dimming rate is set to 75%, a period of 75% of the dimming control period Tb is set as a light emission period. In the dimming control period Tb, the lengths of light emission periods are the same. That is, the length of one light emission period of the organic EL element 21 is (¼)×0.75×dimming control period Tb.

Similarly, when a dimming rate is set to 50%, the length of one light emission period of the organic EL element 21 is (¼)×0.50×dimming control period Tb, and when a dimming rate is set to 25%, the length of one light emission period of the organic EL element 21 is (¼)×0.25×dimming control period Tb.

Further, in the dimming control period Tb, the lengths of non-light emission periods are also the same. That is, as shown in FIG. 4, in the display device 100 according to the first modification example of the present embodiment, when the number of pulses in the dimming control period Tb is a, a=4. On the other hand, there are three (a−1=3) non-light emission periods between light emission periods, and the lengths of the non-light emission periods are the same.

In the dimming control period Tb, when the lengths of non-light emission periods are not equal to each other, a flicker is likely to be recognized. In contrast, when the lengths of the non-light emission periods are equal to each other, a flicker is less likely to be noticeable. For this reason, in the dimming control period Tb, it is preferable that the lengths of the non-light emission periods of the organic EL element 21 be equal to each other.

Second Modification Example

Figure 5:
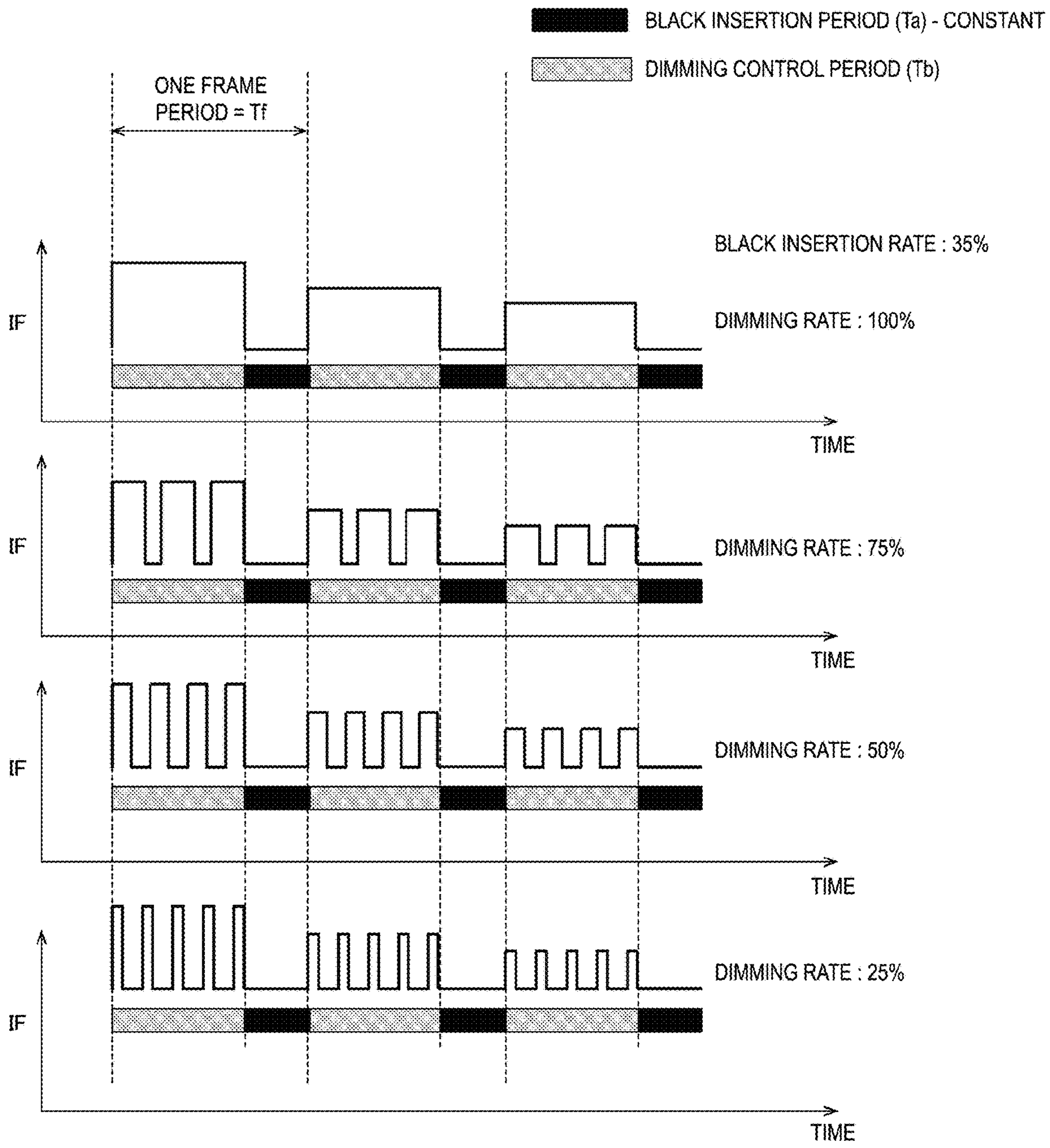
FIG. 5 is a chart showing an example of a black insertion period and a dimming control period that are set in one frame period for one pixel to be caused to perform display on a display device according to a second modification example of the embodiment of the disclosure.

Next, dimming control in a display device 100 according to a second modification example of the present embodiment will be described with reference to FIG. 5. FIG. 5 is a chart showing an example of a black insertion period Ta and a dimming control period Tb that are set in one frame period Tf for one pixel caused to perform display on the display device 100 according to the second modification example of the embodiment of the disclosure. In FIG. 5, the black insertion period Ta and the dimming control period Tb are shown so as to be comparable in the cases where a dimming rate is 100%, 75%, 50%, and 25%. In FIG. 5, the horizontal axis represents time, and the vertical axis represents the amount of forward drive current IF flowing through the organic EL element 21.

Since the display device 100 according to the second modification example of the present embodiment has a similar configuration to that of the display device 100 according to the present embodiment, the same reference numerals are assigned to similar members, and the description thereof will be omitted.

A difference is that the black insertion rate in one frame period Tf is 50% in the display device 100 according to the present embodiment, whereas a black insertion rate in one frame period Tf is 35% in the display device 100 according to the second modification example of the present embodiment.

Another difference is that the number of pulses in the dimming control period Tb is two regardless of a dimming rate in the display device 100 according to the present embodiment, whereas the number of pulses in the dimming control period Tb changes in accordance with a dimming rate in the display device 100 according to the second modification example of the present embodiment.

Here, when a dimming rate that is set in the dimming control period Tb is lowered, the luminance of light emitted from the display portion 10 decreases, and thus a flicker may be noticeable in an image to be displayed. Consequently, in the display device 100 according to the second modification example of the present embodiment, the number of pulses in the dimming control period Tb is changed in accordance with the set dimming rate.

Specifically, in the display device 100 according to the second modification example of the present embodiment, when the set dimming rate is lowered, the EMI control circuit 12 inputs an EMI signal to the third transistor T3 to perform control such that the number of pulses of the organic EL element 21 in the dimming control period Tb is increased. That is, the third transistor T3 increases the number of times of switching between an ON state and an OFF state in response to the input EMI signal, thereby increasing the number of times the organic EL element 21 emits light.

Even when the dimming rate set in this manner is lowered, it is possible to suppress the occurrence of a flicker in an image to be displayed, by increasing the number of pulses in the dimming control period Tb.

Further, when a dimming rate decreases, a light emission period becomes relatively short in the dimming control period Tb, and thus a non-light emission period becomes relatively long. In such a case, it is possible to shorten a period in which no light is emitted continuously in the dimming control period Tb by increasing the number of pulses in the dimming control period Tb. For this reason, the non-light emission period in the dimming control period Tb and the black insertion period Ta can be clearly distinguished from each other.

For the display device 100 according to the second modification example of the present embodiment, FIG. 5 shows the dimming control periods Tb when a black insertion rate in one frame period Tf is 35% and a dimming rate is 75%, 50%, and 25%.

When the dimming rate is 75%, the number of pulses in the dimming control period Tb is three. In the dimming control period Tb, the lengths of light emission periods are the same. For this reason, the length of one light emission period of the organic EL element 21 is (⅓)×0.75×dimming control period Tb.

When the dimming rate is 50%, the number of pulses in the dimming control period Tb is four. In the dimming control period Tb, the lengths of the light emission periods are the same. For this reason, the length of one light emission period of the organic EL element 21 is (¼)×0.50×dimming control period Tb.

When the dimming rate is 25%, the number of pulses in the dimming control period Tb is five. In the dimming control period Tb, the lengths of the light emission periods are the same. For this reason, the length of one light emission period of the organic EL element 21 is (⅕)×0.25×dimming control period Tb.

As described above, the display device 100 according to the second modification example of the present embodiment is configured to increase the number of pulses in the dimming control period Tb when the set dimming rate is decreased.

In the display device 100 according to the second modification example of the present embodiment, it is preferable that the lengths of the non-light emission periods of the organic EL element 21 be the same in the dimming control period Tb from the viewpoint of suppressing the occurrence of a flicker.

Third Modification Example

Figure 6:
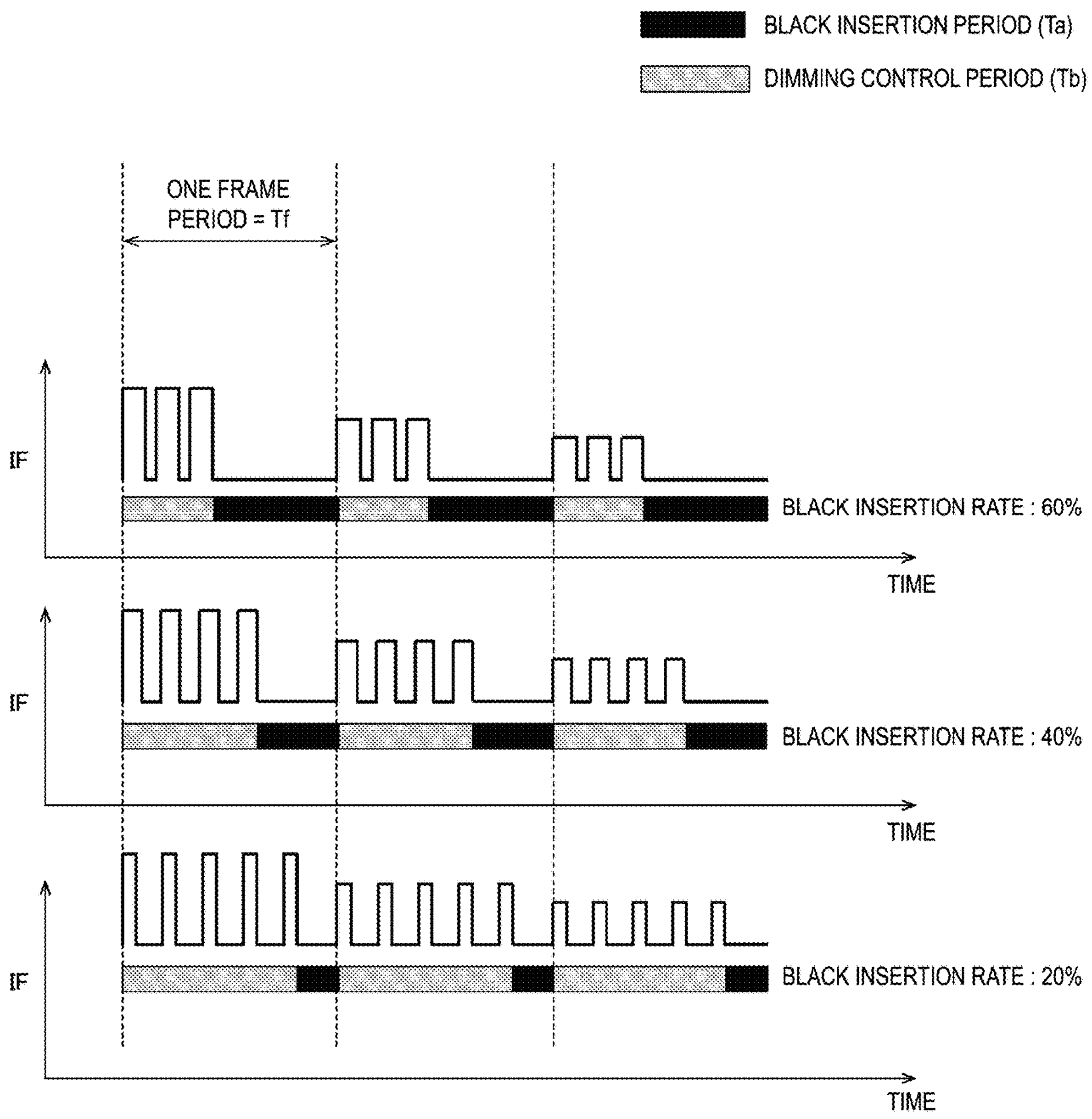
FIG. 6 is a chart showing an example of a black insertion period and a dimming control period that are set in one frame period for one pixel to be caused to perform display on a display device according to a third modification example of the embodiment of the disclosure.

Next, dimming control in a display device 100 according to a third modification example of the present embodiment will be described with reference to FIGS. 6 and 7. FIG. 6 is a chart showing an example of a black insertion period Ta and a dimming control period Tb that are set in one frame period Tf for one pixel caused to perform display on the display device 100 according to the third modification example of the embodiment of the disclosure. In FIG. 6, the black insertion period Ta and the dimming control period Tb are shown so as to be comparable in the cases where a black insertion rate is 60%, 40%, and 20%. In FIG. 6, the horizontal axis represents time, and the vertical axis represents the amount of forward drive current IF flowing through the organic EL element 21. FIG. 7 is a graph showing a correspondence relationship between a black insertion rate, a relative dimming rate, and the number of pulses that are set in one frame period Tf for one pixel caused to perform display on the display device 100 according to the third modification example of the embodiment of the disclosure.

Since the display device 100 according to the third modification example of the present embodiment has a similar configuration to that of the display device 100 according to the present embodiment, the same reference numerals are assigned to similar members, and the description thereof will be omitted.

A difference is that the black insertion rate in one frame period Tf is 50% in the display device 100 according to the present embodiment, whereas a black insertion rate set in one frame period Tf is varied between 60%, 40%, and 20% in the display device 100 according to the third modification example of the present embodiment.

Another difference is that a dimming rate set in the dimming control period Tb is varied between 75%, 50%, and 25% in the display device 100 according to the present embodiment, whereas a dimming rate in each frame period Tf is set to be constant regardless of a black insertion rate in the display device 100 according to the third modification example of the present embodiment.

That is, in the display device 100 according to the present embodiment, a black insertion period Ta included in each frame period Tf is set to be constant for a plurality of frame periods constituting an image to be displayed. However, it is assumed that images of contents with different motions such as a sports image and a landscape image are sequentially displayed on the display device 100. In such a case, in the display device 100 according to the third modification example of the present embodiment, the black insertion rate and dimming rate determination unit 51 determines a black insertion rate in one frame period Tf for each image to be displayed, and an EMI signal for specifying ON/OFF control of the third transistor T3 so as to set the determined black insertion rate is input from the EMI control circuit 12 to the third transistor T3.

Incidentally, when the black insertion period Ta that is set in one frame period Tf is increased, the dimming control period Tb is reduced. For this reason, even when the dimming rate with respect to the dimming control period Tb is the same, the luminance of light emitted from the display portion 10 decreases. In the case where it is necessary to make the luminance for one frame period Tf constant even when the black insertion rate in one frame period Tf is changed, the display device 100 according to the third modification example of the present embodiment performs dimming control such that the dimming rate with respect to one frame period Tf is constant by making a light emission period in the dimming control period Tb constant as shown in FIGS. 6 and 7. Hereinafter, a dimming rate with respect to one frame period Tf will be referred to as an absolute dimming rate. On the other hand, a dimming rate with respect to the dimming control period Tb will be referred to as a relative dimming rate.

Here, as described above, a relationship between the black insertion rate and the dimming control period Tb is such that the dimming control period Tb becomes longer as the black insertion rate becomes lower. When the dimming control period Tb becomes longer under a condition that an absolute dimming rate is constant, a flicker tends to be noticeable.

Consequently, in the display device 100 according to the third modification example of the present embodiment, when the set black insertion rate decreases and the set dimming control period Tb becomes longer, the EMI control circuit 12 inputs an EMI signal to the third transistor T3 to perform control such that the number of pulses in the dimming control period Tb is increased. That is, the third transistor T3 increases the number of times of switching between an ON state and an OFF state in response to the input EMI signal, thereby increasing the number of times the organic EL element 21 emits light.

Specifically, when the absolute dimming rate is set to 20% and the black insertion rate is set to 60%, the number of pulses in the dimming control period Tb is set to three. At this time, the relative dimming rate is 50%. When the absolute dimming rate is set to 20% and the black insertion rate is set to 40%, the number of pulses in the dimming control period Tb is set to four. At this time, the relative dimming rate is 33.3%. When the absolute dimming rate is set to 20% and the black insertion rate is set to 20%, the number of pulses in the dimming control period Tb is set to five. At this time, the relative dimming rate is 25%.

As described above, the display device 100 according to the third modification example of the present embodiment is configured to set the relative dimming rate such that an absolute dimming rate is constant when the absolute dimming rate is constant and the black insertion rate is changed, and is configured to increase the number of pulses in the dimming control period Tb as the black insertion rate decreases.

When the black insertion rate that is set in the manner described above decreases, the dimming control period becomes longer, and thus a non-light emission period in the dimming control period also becomes relatively longer. In such a case, in the display device 100 according to the third modification example of the present embodiment, the number of pulses in the dimming control period Tb can be increased, and thus it is possible to reduce a period of time during which no light is emitted continuously in the dimming control period Tb. For this reason, the non-light emission period in the dimming control period Tb and the black insertion period Ta can be clearly distinguished from each other.

In addition, even in a configuration in which the number of pulses in the dimming control period Tb is changed in accordance with a black insertion rate, it is preferable that light emission intervals of the organic EL element 21 be uniform in the dimming control period Tb from the viewpoint of suppressing the occurrence of a flicker.

Further, as described above, a relationship between the black insertion rate and the dimming control period Tb is such that the dimming control period Tb becomes longer as the black insertion rate decreases. For this reason, the lower the black insertion rate is, the larger the maximum value of the luminance of light emitted from the display portion 10 is. On the other hand, the lower the black insertion rate is, the lower the effect of suppressing a motion blur is. In contrast, the higher the black insertion rate is, the smaller the maximum value of the luminance of light emitted from the display portion 10 is. On the other hand, the higher the black insertion rate is, the higher the effect of suppressing a motion blur is. For this reason, in the display device 100 according to the third modification example of the present embodiment, the black insertion rate may be changed depending on whether an image content to be displayed is a content that is preferable when the maximum value of the luminance is large or a content that is preferable when a motion blur is suppressed.

The invention claimed is:

1. A display device comprising:

a plurality of pixel circuits each including a self-luminous element and a switching element configured to perform switching between light emission and non-light emission of the self-luminous element, the plurality of pixel circuits being provided respectively corresponding to a plurality of pixels; and a control circuit configured to control each of the plurality of pixel circuits in response to an image signal of an image to be displayed, wherein, when a longest period among a plurality of periods in which the self-luminous element continuously emits no light in one frame period, among a plurality of frame periods constituting the image, is set as a black insertion period and a remaining period excluding the black insertion period in the one frame period is set as a dimming control period, the control circuit controls switching between the light emission and the non-light emission by the switching element and thus the self-luminous element emits light at least in a certain period from start of the dimming control period and a certain period until end of the dimming control period, and wherein, when a proportion of a sum of light emission periods in which the self-luminous element emits light in the dimming control period is assumed to be a dimming rate and the dimming rate set in the dimming control period is reduced, the control circuit controls switching between the light emission and the non-light emission by the switching element and thus the number of times of light emission of the self-luminous element in the dimming control period is increased.

2. The display device according to claim 1, wherein lengths of light emission periods in which the self-luminous element emits light are the same in the dimming control period.

3. The display device according to claim 1, wherein, when the number of times of light emission of the self-luminous element in the dimming control period is n, and n is 3 or more, lengths of (n−1) non-light emission periods in each of which the self-luminous element emits no light in the dimming control period are the same.

4. The display device according to claim 1, wherein, when a proportion of the black insertion period in the one frame period is assumed to be a black insertion rate and the black insertion rate set in the one frame period is reduced, the control circuit controls switching between the light emission and the non-light emission by the switching element and thus the number of times of light emission of the self-luminous element in the dimming control period is increased.

5. The display device according to claim 4, further comprising a black insertion rate determination unit configured to determine the black insertion rate, wherein the control circuit controls switching between the light emission and the non-light emission by the switching element in accordance with the black insertion rate determined by the black insertion rate determination unit.

6. The display device according to claim 5, wherein the control circuit controls switching between the light emission and the non-light emission by the switching element and thus the black insertion rate determined by the black insertion rate determination unit is set for each of the plurality of frame periods.

7. The display device according to claim 5, wherein the black insertion rate determination unit determines the black insertion rate in accordance with the type of image to be displayed.

8. The display device according to claim 5, wherein the black insertion rate determination unit detects a motion amount of the image in response to the image signal, and determines the black insertion rate in accordance with the motion amount.

9. The display device according to claim 1, further comprising a dimming rate determination unit configured to determine the dimming rate, wherein the control circuit controls switching between the light emission and the non-light emission by the switching element in accordance with the dimming rate determined by the dimming rate determination unit.

10. The display device according to claim 9, further comprising an input unit configured to input a setting value of the dimming rate, wherein the dimming rate determination unit determines the dimming rate based on the setting value of the dimming rate input from the input unit.

11. The display device according to claim 9, further comprising a sensor configured to measure brightness around the display device, wherein the dimming rate determination unit sets the dimming rate based on a measurement value indicating the brightness around the display device and measured by the sensor.

12. The display device according to claim 9, wherein the dimming rate determination unit obtains an average luminance value of the image to be displayed and sets the dimming rate based on the average luminance value.

13. A display device comprising:

a plurality of pixel circuits each including a self-luminous element and a switching element configured to perform switching between light emission and non-light emission of the self-luminous element, the plurality of pixel circuits being provided respectively corresponding to a plurality of pixels; and a control circuit configured to control each of the plurality of pixel circuits in response to an image signal of an image to be displayed, wherein, when a longest period among a plurality of periods in which the self-luminous element continuously emits no light in one frame period, among a plurality of frame periods constituting the image, is set as a black insertion period and a remaining period excluding the black insertion period in the one frame period is set as a dimming control period, the control circuit controls switching between the light emission and the non-light emission by the switching element and thus the self-luminous element emits light at least in a certain period from start of the dimming control period and a certain period until end of the dimming control period, and wherein, when a proportion of the black insertion period in the one frame period is assumed to be a black insertion rate and the black insertion rate set in the one frame period is reduced, the control circuit controls switching between the light emission and the non-light emission by the switching element and thus the number of times of light emission of the self-luminous element in the dimming control period is increased.

14. The display device according to claim 13, wherein lengths of light emission periods in which the self-luminous element emits light are the same in the dimming control period.

15. The display device according to claim 13, wherein, when the number of times of light emission of the self-luminous element in the dimming control period is n, and n is 3 or more, lengths of (n−1) non-light emission periods in each of which the self-luminous element emits no light in the dimming control period are the same.

16. The display device according to claim 13, further comprising a black insertion rate determination unit configured to determine the black insertion rate, wherein the control circuit controls switching between the light emission and the non-light emission by the switching element in accordance with the black insertion rate determined by the black insertion rate determination unit.

17. The display device according to claim 16, wherein the control circuit controls switching between the light emission and the non-light emission by the switching element and thus the black insertion rate determined by the black insertion rate determination unit is set for each of the plurality of frame periods.

18. The display device according to claim 16, wherein the black insertion rate determination unit determines the black insertion rate in accordance with the type of image to be displayed.

19. The display device according to claim 16, wherein the black insertion rate determination unit detects a motion amount of the image in response to the image signal, and determines the black insertion rate in accordance with the motion amount.

* * * * *